United States Patent
Kasai

(10) Patent No.: US 11,808,969 B2
(45) Date of Patent: Nov. 7, 2023

(54) PLANAR LIGHT SOURCE AND METHOD OF MANUFACTURING PLANAR LIGHT SOURCE

(71) Applicant: Nichia Corporation, Anan (JP)

(72) Inventor: Daisuke Kasai, Tokushima (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 17/943,519

(22) Filed: Sep. 13, 2022

(65) Prior Publication Data

US 2023/0003933 A1    Jan. 5, 2023

Related U.S. Application Data

(62) Division of application No. 17/338,411, filed on Jun. 3, 2021, now Pat. No. 11,480,725.

(30) Foreign Application Priority Data

Jun. 4, 2020 (JP) .................................. 2020-097962
Mar. 23, 2021 (JP) .................................. 2021-048035

(51) Int. Cl.
*G02F 1/1335* (2006.01)
*F21V 8/00* (2006.01)
(Continued)

(52) U.S. Cl.
CPC .......... *G02B 6/0083* (2013.01); *F21V 23/002* (2013.01); *F21V 33/0052* (2013.01);
(Continued)

(58) Field of Classification Search
CPC ......... G02F 1/133612; G02F 1/133524; G02F 1/133603; F21V 23/002; H01L 21/70
See application file for complete search history.

(56) References Cited

U.S. PATENT DOCUMENTS 7,654,687 B2    2/2010 Tsai et al.
8,246,187 B2    8/2012 Cheong et al.
(Continued)

FOREIGN PATENT DOCUMENTS

JP    2008-059786 A    3/2008
JP    2008-305714 A    12/2008
(Continued)

OTHER PUBLICATIONS

Restriction Requirement in U.S. Appl. No. 17/338,411 dated Jan. 28, 2022.
(Continued)

*Primary Examiner* — Zheng Song
(74) *Attorney, Agent, or Firm* — Foley & Lardner LLP

(57) ABSTRACT

A method of manufacturing a planar light source includes: providing a wiring substrate; locating a light guide plate on a first principal face of the wiring substrate, wherein the light guide plate includes a plurality of unit regions arranged in one dimension or two dimensions, and a plurality of through holes that are open at the a principal face and a second principal face of the light guide plate, wherein at least one of the through holes is located in the unit regions; locating light sources in the through holes in the unit regions on the first principal face of the wiring substrate; locating a first light transmissive member in a first of the through holes; and locating a second light transmissive member in the first through hole.

7 Claims, 10 Drawing Sheets

(51) Int. Cl.
*F21V 33/00* (2006.01)
*F21V 23/00* (2015.01)
*F21Y 105/16* (2016.01)

(52) U.S. Cl.
CPC ..... *F21Y 2105/16* (2016.08); *G02F 1/133524* (2013.01); *G02F 1/133612* (2021.01)

(56) References Cited

U.S. PATENT DOCUMENTS

| | | | |
|---|---|---|---|
| 8,301,002 | B2 | 10/2012 | Shani |
| 9,212,796 | B2 | 12/2015 | Ngai |
| 9,863,605 | B2 * | 1/2018 | Haitz ............... F21V 13/08 |
| 2005/0265029 | A1 | 12/2005 | Epstein et al. |
| 2007/0121340 | A1 * | 5/2007 | Hoshi ............. G02B 6/0021 362/600 |
| 2007/0147073 | A1 | 6/2007 | Sakai et al. |
| 2009/0196071 | A1 * | 8/2009 | Matheson ........ G02B 6/0021 362/623 |
| 2011/0037740 | A1 * | 2/2011 | Yamaguchi ...... G02F 1/133603 362/558 |
| 2011/0194034 | A1 | 8/2011 | Shimizu |
| 2014/0133180 | A1 | 5/2014 | Sakai |
| 2015/0077990 | A1 * | 3/2015 | Park ............... G02B 6/0078 362/235 |
| 2015/0185137 | A1 | 7/2015 | Amari |
| 2016/0356940 | A1 * | 12/2016 | Ngai ............... G02B 6/0068 |
| 2017/0261161 | A1 | 9/2017 | Moon et al. |
| 2018/0239081 | A1 * | 8/2018 | Maki ............... G02B 6/0021 |
| 2019/0371981 | A1 | 12/2019 | Bando |
| 2020/0049877 | A1 * | 2/2020 | Watanabe ........ G02B 6/0025 |
| 2020/0400998 | A1 * | 12/2020 | Lee ................. G02B 6/0055 |
| 2021/0341666 | A1 * | 11/2021 | Lu .................. G02B 6/0021 |

FOREIGN PATENT DOCUMENTS

| | | |
|---|---|---|
| JP | 2012-195350 A | 10/2012 |
| JP | 2015-509655 A | 3/2015 |
| JP | 2015-144234 A | 8/2015 |
| JP | 2017-224707 A | 12/2017 |
| JP | 2018-026596 A | 2/2018 |
| JP | 2019-212699 A | 12/2019 |
| KR | 10-2009-0117419 A | 11/2009 |
| WO | WO-2010/070885 A1 | 6/2010 |
| WO | WO-2013/134017 A1 | 9/2013 |

OTHER PUBLICATIONS

Non-Final Rejection in U.S. Appl. No. 17/338,411 dated Feb. 24, 2022.

Notice of Allowance in U.S. Appl. No. 17/338,411 dated Jul. 5, 2022.

* cited by examiner

PLANAR LIGHT SOURCE AND METHOD OF MANUFACTURING PLANAR LIGHT SOURCE

CROSS-REFERENCE TO RELATED APPLICATIONS

This application is a division of U.S. patent application Ser. No. 17/338,411, filed on Jun. 3, 2021, which claims priority to Japanese Patent Application No. 2020-097962, filed on Jun. 4, 2020, and Japanese Patent Application No. 2021-048035, filed on Mar. 23, 2021. The disclosures of these applications are hereby incorporated by reference in their entireties.

BACKGROUND

The present disclosure relates to a planar light source and a method of manufacturing a planar light source.

As a backlight of a liquid crystal display device, for example, Japanese Patent Publication No. 2008-59786 discloses a direct-lit planar light source equipped with a light guide member and a plurality of two dimensionally-arranged light sources.

SUMMARY

One object of the present disclosure is to provide a planar light source structured to allow at least either the chromaticity or the luminance of a light source to be adjusted during manufacturing, and a method of manufacturing the same.

According to one embodiment, a planar light source includes: a light guide plate including: a first principal face, a second principal face located opposite the first principal face, a plurality of unit regions that are arranged in one dimension or two dimensions, a plurality of through holes that are open at the first principal face and the second principal face, wherein at least one of the through holes is located in the unit regions; a plurality of light sources, wherein at least one of the light sources is located in the through holes of the light guide plate; a wiring substrate on which the plurality of light sources are located, the wiring substrate being positioned on a second principal face side of the light guide plate; a first light transmissive member located in a first of the through holes so as to cover at least a portion of a lateral face of the at least one light source located in the first through hole; and a second light transmissive member located in the first through hole so as to cover at least an upper face of the first light transmissive member.

According to another embodiment, a method of manufacturing a planar light source includes: providing a wiring substrate including: a first principal face, and a second principal face located opposite the first principal face; locating a light guide plate on the first principal face of the wiring substrate, wherein the light guide plate includes: a first principal face, a second principal face located opposite the first principal face, a plurality of unit regions arranged in one dimension or two dimensions, and a plurality of through holes that are open at the first principal face and the second principal face, wherein at least one of the through holes is located in the unit regions; locating light sources in the through holes in the unit regions on the first principal face of the wiring substrate; locating a first light transmissive member in a first of the through holes so as to cover at least a portion of a lateral face of at least one light source located in the first through hole; and locating a second light transmissive member in the first through hole so as to cover at least an upper face of the first light transmissive member.

According to certain embodiments of the present disclosure, a planar light source structured to allow at least either the chromaticity or the luminance of a light source to be adjusted during manufacturing process can be produced.

DETAILED DESCRIPTION

Figure 1:
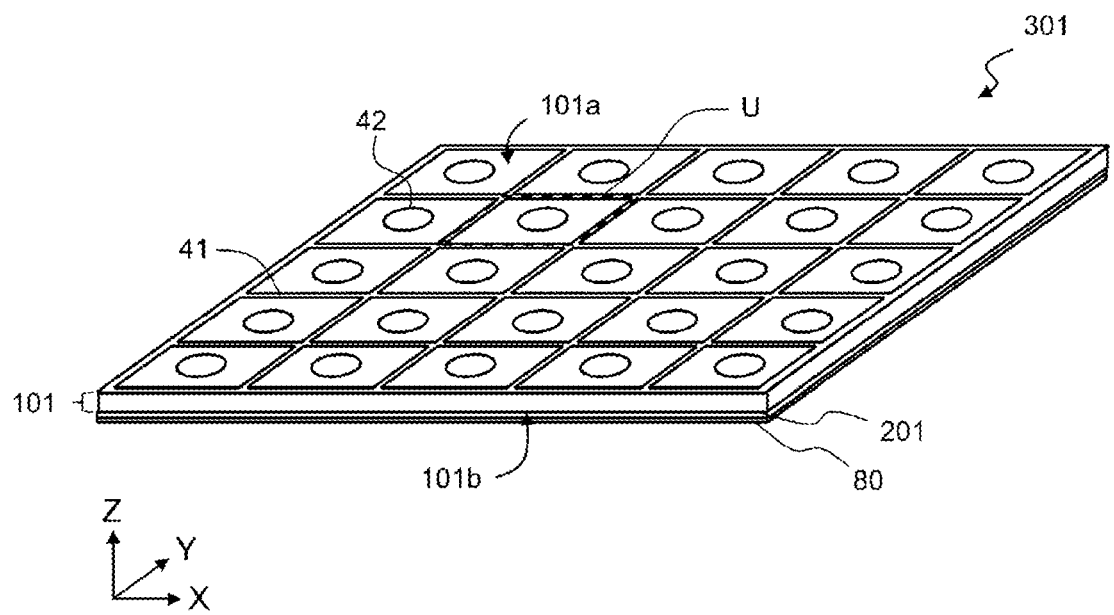
FIG. 1 is a schematic perspective view of an embodiment of a planar light source.

Certain embodiments of the present disclosure will be explained in detail with reference to the accompanying drawings. The embodiments described below are exemplary, and the planar light sources and the methods of manufacturing planar light sources according to the present disclosure are not limited to the embodiments described below. For example, the numerical values, shapes, materials, processes, and the sequence of the processes are presented merely as examples, and can be modified in various ways to the extent that such modifications do not cause any technical inconsistency. The embodiments described below are merely provided as examples, and can be combined in various ways to the extent that such combinations do not cause any technical inconsistency.

The dimensions, shapes, and the like of the constituent elements shown in the drawings might be exaggerated for clarity, and might not reflect the dimensions and the shapes of, and the magnitude relations between, the constituent elements in an actual planar light source. Furthermore, certain elements might be omitted in a drawing or a cut section might be shown as a cross-sectional view such that the drawing would not be excessively complex.

In the explanation below, the constituent elements having practically the same function will be denoted with common reference numerals for which redundant explanation will be omitted. Furthermore, terms indicating directions or positions (for example, "above," "under," "right," "left" or other terms related thereto) might occasionally be used. These terms, however, are merely used to clarify the relative directions or positions in a referenced drawing. As long as the relationship between the directions or the positions indicated with the terms such as "above," "under," or the like is the same as that in a referenced drawing, the layout of the elements in another drawing, an actual product, and manufacturing equipment outside of the present disclosure, does not have to be the same as that shown in the referenced drawing. "Parallel" in the present disclosure includes cases where the two straight lines, sides, planes, or the like form an angle in the range of about 0° to ±5° unless otherwise specifically noted. Furthermore, "perpendicular" or "orthogonal" in the present disclosure includes cases where two straight lines, sides, planes, or the like form an angle deviating from 90° by about ±5° unless otherwise specifically noted. Furthermore, the positional relationship expressed by the term "above" includes a case where a part is on and in contact with another part as well as a case where a part is positioned above another part without being in contact.

Structure of Planar Light Source 301

Figure 2:
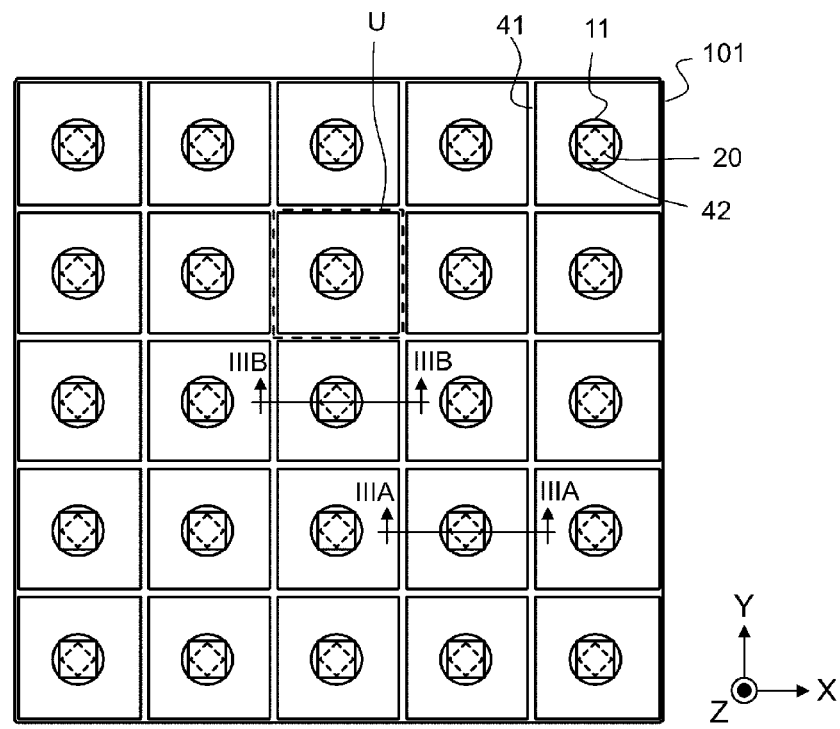
FIG. 2 is a schematic top view of the planar light source shown in FIG. 1.

FIG. 1 is a schematic perspective view of a planar light source 301 according to one embodiment, and FIG. 2 is a schematic top view of the planar light source 301. The planar light source 301 includes a light emitting module 101 and a wiring substrate 201. The planar light source 301 can further include an insulation layer 80 that protects the wiring substrate 201.

The light emitting module 101 includes a plurality of one-dimensionally or two-dimensionally arranged light emitting units U. In this embodiment, the light emitting units U, as shown in FIG. 2, are two-dimensionally arranged in the x and y directions. In the example shown in the drawings such as FIG. 1, the light emitting module 101 includes 25 light emitting units U, across five rows and five columns in the x and y directions. However, the number of light emitting units U included in the light emitting module 101 is optional, i.e., can be another number. At least one of the light emitting units U is a square or rectangular, each side being 1 mm to 20 mm, preferably 4 mm to 10 mm. The light emitting module 101 can correspond to the screen size of a display device that uses the light emitting module, or a plurality of light emitting modules 101 can be arranged to correspond to the screen size of a display device.

Figure 3A:
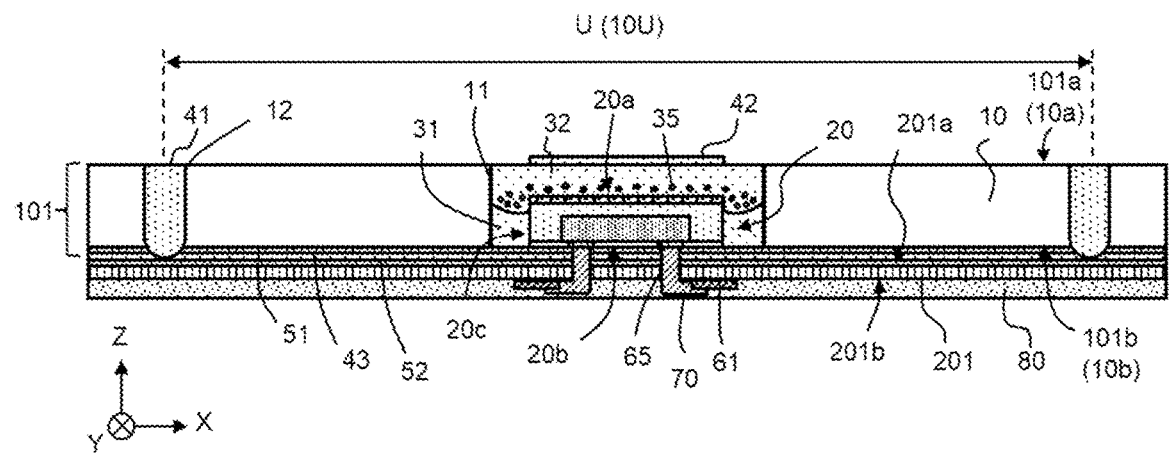
FIG. 3A is a schematic cross-sectional view of one light emitting unit in the planar light source shown in FIG. 1 taken along line IIIA-IIIA in FIG. 2.
Figure 3B:
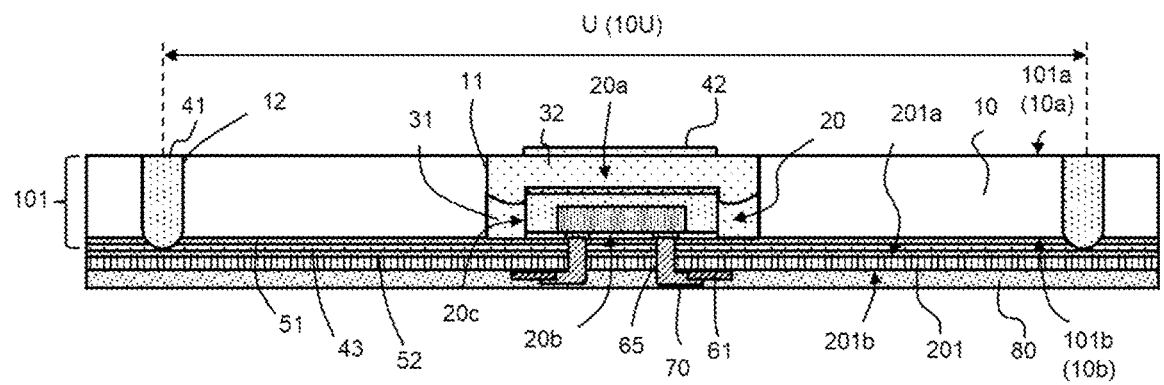
FIG. 3B is a schematic cross-sectional view of another light emitting unit in the planar light source shown in FIG. 1 taken along line IIIB-IIIB in FIG. 2.
Figure 5A:
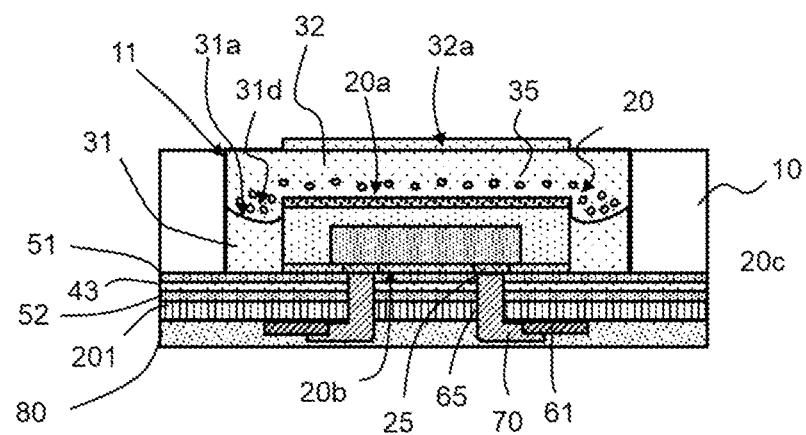
FIG. 5A is a schematic cross-sectional view of the main part of one light emitting unit in the planar light source shown in FIG. 1.

FIG. 3A and FIG. 3B are schematic cross-sectional views of the light emitting units U in the planar light source 301 taken along line IIIA-IIIA and line IIIB-IIIB, respectively, in FIG. 2. FIG. 5A is a schematic cross-sectional view of the main part in FIG. 3A.

At least one of the light emitting units U includes a light source 20, and the light emitted from the light source 20 exits the upper face 101a of the light emitting module 101. A wiring substrate 201 is disposed on the lower face 101b of the light emitting module 101, and the light source 20 of at least one of the light emitting units U is electrically connected to the wiring substrate 201. Supplying power to the wiring substrate 201 from the outside, all light sources 20 can be simultaneously lit or some of the light sources can be selectively lit. As shown in FIG. 3A, a phosphor 35 can be added to at least one of the light emitting units U. By adding the phosphor 35, the chromaticity of the light emitted from the light emitting unit U can be adjusted during manufacturing process. FIG. 3B shows a cross section of a light emitting unit U that does not contain any phosphor 35.

As shown in FIG. 3A and FIG. 3B, the light emitting module 101 of the planar light source 301 includes a light guide plate 10, a light source 20, a first light transmissive member 31, and a second light transmissive member 32. As will be described in detail below, the light emitting module 101 of the planar light source 301 can further include a light reflecting member 41, a light shielding member 42, a light reflecting sheet 43, and a phosphor 35. The structure of the planar light source 301 will be explained in more detail below element by element.

Light Guide Plate 10

A light guide plate 10 allows the light emitted from the light source 20 of at least one of the light emitting units U to propagate at least in the light emitting unit U and exit the upper face 101a of the light emitting module 101. The light guide plate 10 includes a first principal face 10a, a second principal face 10b positioned opposite the first principal face 10a, a plurality of one-dimensionally or two-dimensionally arranged unit regions 10U, and at least one of a plurality of through holes 11 located in the unit regions 10U while being open in the first principal face 10a and the second principal face 10b. The first principal face 10a is also the upper face 101a of the light emitting module 101. A unit region 10U is a unit of the light guide plate 10 included in each light emitting unit U. In this embodiment, in the light guide plate 10, the unit regions 10U are arranged in five rows and five columns. In a top view, the unit regions 10U are quadrilateral shaped, and as shown in FIG. 2, two sets of sides of each quadrilateral are in parallel with the x and y directions.

At least one of the through holes 11 is open in the first principal face 10a and the second principal face 10b, and is located in the center of the unit region 10U in the xy plane as shown in FIG. 2. In the top view, the center of the through hole 11 preferably overlaps with the center of the unit region 10U. In this embodiment, the through hole 11 has a cylindrical shape, and circular openings in the first principal face 10a and the second principal face 10b. At this time, the width (diameter) of a through hole 11 can simply be large enough to house a light source 20 in the through hole 11, preferably, for example, 1.5 mm to 15 mm, more preferably 2 mm to 6 mm. The distance between through holes 11 arranged in adjacent unit regions 10U is preferably the same as the length of a side of a light emitting unit U, for example, 1 mm to 20 mm, more preferably 4 mm to 10 mm.

Figure 11A:
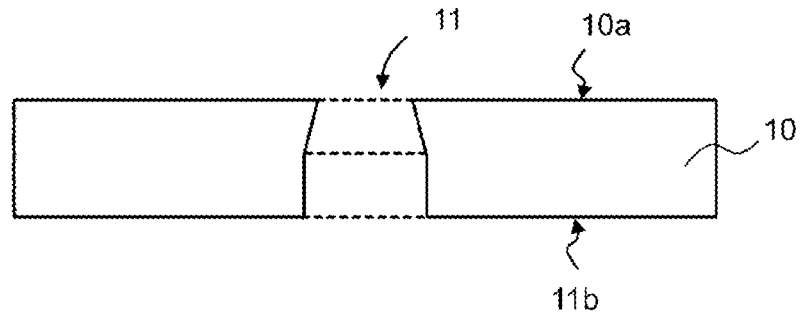
FIG. 11A is a schematic cross-sectional view of another example of a through hole of the light guide plate.
Figure 11B:
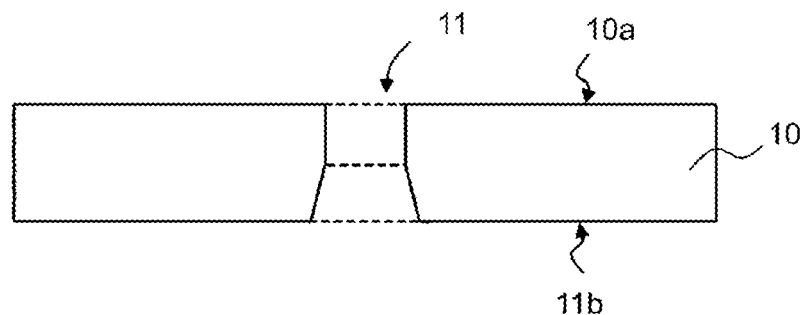
FIG. 11B is a schematic cross-sectional view of another example of a through hole of the light guide plate.
Figure 11C:
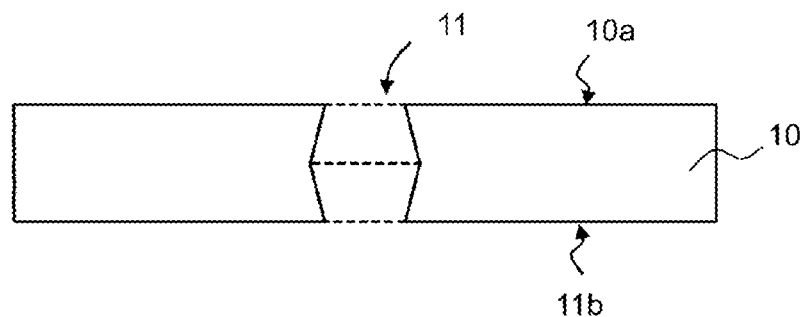
FIG. 11C is a schematic cross-sectional view of another example of a through hole of the light guide plate.
Figure 11D:
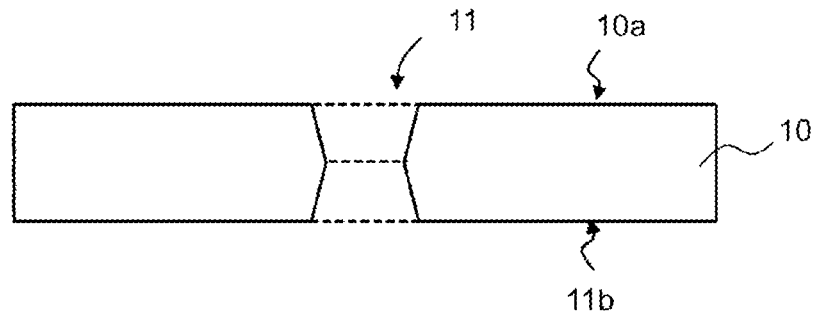
FIG. 11D is a schematic cross-sectional view of another example of a through hole of the light guide plate.

The openings of a through hole 11 are not limited to a circular shape, and can be an elliptical or polygonal shape. Moreover, the sizes of the opening at the first principal face 10a and the opening at the second principal face 10b can be different. For example, a through hole 11 can have a shape of a conical frustum in which the opening in the first principal face 10a is larger or smaller than the opening in the second principal face 10b. A through hole 11 can have a shape that combines a cylinder and a conical frustum, or two conical frustums. FIG. 11A to FIG. 11D show other examples of the shape of a through hole 11. FIG. 11A is an example of a through hole 11 having a shape in which a cylinder is connected to the bottom face of a conical frustum, FIG. 11B is an example of a through hole 11 having a shape in which a cylinder is connected to the upper face of a conical frustum, FIG. 11C is an example of a through hole 11 having a shape in which two conical frustums are connected at their bottom faces, and FIG. 11D is an example of a through hole 11 having a shape in which two conical frustums are connected at their upper faces. The shapes combining a cylinder and a conical frustum are not limited to the examples shown in FIG. 11A and FIG. 11B, and each shape can be flipped upside down when formed in the light guide plate 10.

As will be described later, in the case in which the light emitting unit U is sectioned using light reflecting members 41, the light guide plate 10 can include sectioning grooves 12 where the light reflecting members 41 are disposed. The sectioning groove 12, for example, has an opening in the first principal face 10a and extends in the x direction or the y direction along the border between adjacent unit regions 10U. The width of a sectioning groove 12 can be set to about 10% or less of the width of a light emitting unit U, for example. More specifically, the width of a sectioning groove 12 is preferably 0.03 mm to 1 mm, more preferably 0.05 mm to 0.8 mm. In this embodiment, the sectioning grooves 12 reach the light reflecting sheet 43, and the light guide plate 10 is divided per unit region 10U. However, the light guide plate 10 can be partially connected by not allowing the bottoms of the sectioning grooves 12 to reach the second principal face 10b. In the top view, the sectioning groves 12 are arranged along the perimeter of the unit region 10U, i.e., the unit region 10U is surrounded by the sectioning grooves 12.

The upper face of the light guide member 10 may have protrusions and/or depression in a low luminance region in order to, for example, reduce luminance nonuniformity.

The light guide plate 10 is formed of a light transmissive material. For example, a thermoplastic resin, such as an acrylic resin, polycarbonate resin, cyclic polyolefin resin, polyethylene terephthalate resin, or polyester resin, a thermosetting resin, such as epoxy resin or silicone resin, or a material such as glass can be used. The thickness of the light guide plate 10 is, for example, 200 µm to 800 µm.

Light Source 20

The light sources 20 are disposed in the through holes 11 of the light guide plate 10 such that one light source corresponds to one unit region 10U. In this embodiment, one light source 20 is disposed in each through hole 11, but two or more light sources 20 can be disposed in a through hole 11. The light sources 20 each have an upper face 20a, a lower face 20b, and a lateral face 20c. The shape of a light source 20 in the top view, for example, is a quadrilateral having four lateral faces 20c. As shown in FIG. 2, in the top view, for example, no side of the quadrilateral light sources 20 is in parallel with any side of the quadrilateral unit regions 10U. In the example shown in FIG. 2, because the light sources 20 and the unit regions 10U are square shaped in the top view, each side of a light source 20 forms a +45 degree or 135 degree (−45 degree) angle with each side of a unit region 10U. Arranged in this manner, the four lateral faces of each light source 20 face the four corners of the corresponding unit region in the top view. This can suppress decrease of the luminance near the four corners most distant from the center of the unit region 10U.

Figure 4:
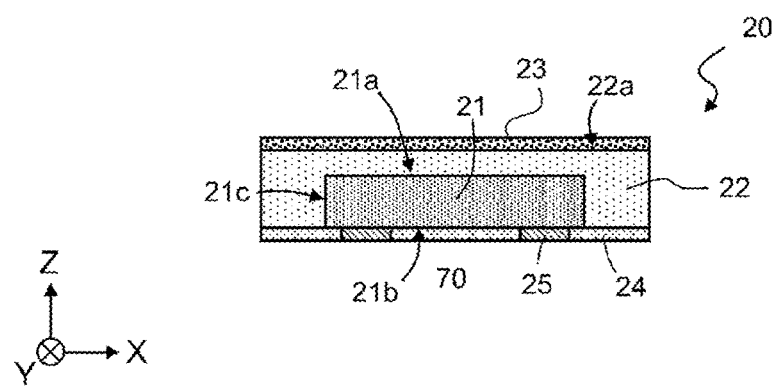
FIG. 4 is a schematic cross-sectional view of a light source used in the planar light source shown in FIG. 1.

FIG. 4 is a cross-sectional view of a light source 20. The light source 20 can be a light emitting element by itself, or structured as a combination of a light emitting element and an optical member such as a wavelength conversion member or the like. In this embodiment, the light source 20, as shown in FIG. 4, includes a light emitting element 21, a light transmissive member 22, a light adjusting member 23, a cover member 24, and electrodes 25. The electrodes 25 can be omitted as appropriate in the case of using the p-side and n-side electrodes of the light emitting element 21 described later as the electrodes of the light source 20.

A typical example of a light emitting element 21 is an LED. The light emitting element 21 includes, for example, a support substrate formed of sapphire or gallium nitride, and a semiconductor stack on the support substrate. The semiconductor stack includes an n-type semiconductor layer, p-type semiconductor layer, a light emitting layer interposed between these, p-side and n-side electrodes electrically connected to the n-type and p-type semiconductor layers. The semiconductor stack can include a nitride semiconductor ($In_xAl_yGa_{1-x-y}N$, $0 \leq x$, $0 \leq y$, $x+y \leq 1$) capable of emitting light in the ultraviolet to visible spectrum.

The emission layer can have a double heterojunction or single quantum well (SQW) structure, or one having a group of light emitting layers such as a multiple quantum well (MQW) structure.

The semiconductor stack can be structured with one or more emission layers included between the n-type semiconductor layer and the p-type semiconductor layer, or by repeating successive stacking of an n-type semiconductor layer, a light emitting layer, and a p-type semiconductor layer multiple times in this sequence. In the case in which the semiconductor stack includes a plurality of light emitting layers, the emission layers can have the same peak emission wavelength or different peak emission wavelengths. The same peak emission wavelength here includes cases in which the peak emission wavelengths vary by about a few nanometers. Light emitting layers having different peak emission wavelengths can be suitably combined. In the case in which the semiconductor stack includes two light emitting layers, for example, light emitting layers can be selected in a combination of blue light and blue light, green light and green light, red light and red light, UV light and UV light, blue light and green light, blue light and red light, green light and red light or the like. Each light emitting layer can include a plurality of active layers having different peak emission wavelengths, or a plurality of active layers of the same peak emission wavelength.

The light emitting element 21 can be one that emits blue light, or light of another color, such as red or green. Furthermore, one light emitting unit U can include a light emitting element that emits red light, a light emitting element that emits blue light, and a light emitting element that emits green light. In this embodiment, a blue light emitting LED is used as an example as the light emitting element 21 of each light emitting unit U.

The shape of the light emitting element 21 in the top view is typically a quadrilateral. The length of one side of a quadrilateral light emitting element 21 is, for example, 1000 µm or less. The vertical and horizontal dimensions of the quadrilateral shaped light emitting element 21 can be 500 µm or less. Light emitting elements having vertical and horizontal dimensions of 500 µm or less can be procured inexpensively. The vertical and horizontal dimensions of the quadrilateral shaped light emitting element 21 can be 200 µm or less. A quadrilateral light emitting element 21 having short sides is advantageous for high-resolution image expressions, local dimming operations, and the like when applied to a backlight unit of a liquid crystal display device. Particularly, because a light emitting element in which both the vertical and horizontal dimensions are 250 µm or less has a small upper face area, a relatively large amount of light is emitted from the lateral faces of the light emitting element. Accordingly, the light emitting element can readily achieve a batwing light distribution. The batwing light distribution here, in a broad sense, refers to one defined by an emission intensity distribution having higher emission intensity at the absolute distribution angle values greater than 0°, assuming that the optical axis perpendicular to the upper face of the light emitting element is 0°.

The light emitting element 21 includes an emission face 21a, an electrode face 21b, and lateral faces 21c. On the electrode face 21b, a pair of electrodes 25 respectively electrically connected to the p-side electrode and the n-side electrode are located.

A light transmissive member 22 is disposed to cover the emission face 21a and the lateral faces 21c of a light emitting element 21. The light transmissive member 22 protects the light emitting element 21 and provides wavelength conversion and/or light diffusion functions in accordance with the particles added to the light transmissive member 22. Specifically, the light transmissive member 22 contains a light transmissive resin and can further contain a phosphor. In the case of containing a phosphor, the light transmissive member 22 also serves as a wavelength conversion member. For the phosphor, yttrium aluminum garnet based phosphors (e.g., $Y_3(Al,Ga)_5O_{12}$:Ce), lutetium aluminum garnet based phosphors (e.g., $Lu_3(Al,Ga)_5O_{12}$:Ce), terbium aluminum garnet based phosphors (e.g., $Tb_3(Al,Ga)_5O_{12}$:Ce), CCA-based phosphors (e.g., $Ca_{10}(PO_4)_6C_{12}$:Eu), SAE-based phosphors (e.g., $Sr_4Al_{14}O_{25}$:Eu), chlorosilicate-based phosphors (e.g., $Ca_8MgSi_4O_{16}C_{12}$:Eu), β-SiAlON based phosphors (e.g., $(Si,Al)_3(O,N)_4$:Eu), α-SiAlON based phosphors (e.g., $M_z(Si,Al)_{12}(O,N)_{16}$:Eu ($0<z\leq2$, and M is Li, Mg, Ca, Y, and lanthanide elements excluding La and Ce), SLA-based phosphors (e.g., $SrLiAl_3N_4$:Eu), nitride based phosphors, such as CASN based phosphor (e.g., $CaAlSiN_3$:Eu) or SCASN based phosphors (e.g., $(Sr,Ca)AlSiN_3$:Eu), fluoride based phosphors, such as KSF based phosphors (e.g., $K_2SiF_6$:Mn), KSAF-based phosphors (e.g., $K_2(Si,Al)F_6$:Mn), or MGF based phosphors (e.g., $3.5MgO\cdot0.5MgF2\cdot GeO_2$:Mn), phosphors having a perovskite structure (e.g., $CsPb(F,Cl,Br,I)_3$) or quantum dot phosphors (e.g., CdSe, InP, $AgInS_2$, or $AgInSe_2$) can be used.

The light transmissive member 22 can contain multiple kinds of phosphors, for example, a phosphor absorbing blue light and emitting yellow light, and a phosphor absorbing blue light and emitting red light. This allows a light source 20 to emit white light, for example. The light transmissive member 22 can contain a light diffusing material to the extent that it does not shield light. The content of the light diffusing material in the light transmissive member 22 can be adjusted such that the transmittance of the light transmissive member 22 relative to the light emitted from the light emitting element 21 is in range of 50% to 99%, preferably in range of 70% to 90%. For the light diffusing material, for example, titanium oxide, silica, alumina, zinc oxide, or glass can be used.

A cover member 24 is disposed on the electrode face 21b excluding the electrodes 25 that are electrically connected to a light emitting element 21, further covering the lower face of the light transmissive member 22. The cover member 24 has light reflecting properties, reflecting the portion of the light from the light emitting layer of a light emitting element 21 advancing towards the electrode face 21b to the emission face 21a. The cover member 24 is constructed, for example, with a resin material containing a light diffusing material. Specifically, the cover member 24 is a silicon resin or an epoxy resin containing a light diffusing material formed of particles of titanium oxide, silica, alumina, zinc oxide, or glass. The cover member 24 can be an inorganic member.

A light adjusting member 23 is positioned on the upper face 22a of the light transmissive member 22, and controls the amount or the direction of the light exiting the upper face 22a of the light transmissive member 22. The light adjusting member 23 can be constructed with, for example, a light transmissive resin material in which the light diffusing material described above is dispersed, a metal thin film, an inorganic member, or the like. A portion of the light exiting the upper face 22a of the light transmissive member 22 is reflected by the light diffusing material or the metal thin film, and the other portion transmits through the light adjusting member 23. The transmittance of the light adjusting member 23 is, for example, preferably in a range of 1% to 50%, more preferably in a range of 3% to 30%. This can reduce the luminance directly above the light source 20, thereby reducing in-plane luminance non-uniformity of the planar light source 301.

First Light Transmissive Member 31

As shown in FIG. 5A, a first light transmissive member 31 is disposed in a through hole 11 so as to cover at least a portion of the lateral faces of the light source 20 in at least one of the unit regions 10U of the light guide plate 10. More specifically, the first light transmissive member 31 is located on the second principal face 10b side in the through hole 11 and is in contact with the light transmissive adhesive sheet 51 described later as well as being in contact with the lateral face 11c that defines the through hole 11 and the lateral faces 20c of the light source 20. The first light transmissive member 31 can be in contact with the lateral face 11c that defines the through hole 11 in part or whole. This allows the light that has exited the lateral faces 20c of the light source 20 to efficiently enter the light guide plate 10. The first light transmissive member 31 can cover at least one of the four lateral faces 20c of the light source 20, and in this embodiment, the first light transmissive member 31 covers the four lateral faces 20c of the light source 20. Furthermore, the first light transmissive member 31 is preferably in contact with the light transmissive member 22 that is partly configured as the lateral faces 20c of the light source 20. In order to allow the light from the light source 20 to more efficiently enter the light guide plate 10, the first light transmissive member 31 preferably has a higher refractive index than the refractive index of a member that is configured as the lateral faces 20c of the light source 20 (i.e., the light transmissive member 22 in this embodiment). The refractive index of the first light transmissive member 31 is preferably lower than the refractive index of the light guide plate 10.

The light sources 20 are disposed in the through holes 11 of the light guide plate 10 and the first light transmissive members 31 are supplied in the through holes 11 when manufacturing a planar light source 301, to thereby secure the light sources 20 in place and electrically connect the light sources 20 to the wiring substrate 201. This makes it possible to perform a lighting inspection by lighting the light sources 20 in this state, such as checking the colors of the light emitted by the light sources 20, the beam spread of light in the light guide plate 10, and the chromaticity balance of the planar light source as a whole.

In the case in which the planar light source 301 includes light shielding members 42, it is preferable that the first light transmissive members 31 are not positioned on the upper faces 20a of the light sources 20, i.e., not covering the upper faces 20a. With a structure in which the upper faces 20a of the light sources 20 are not covered with the first light transmissive members 31, the light that has entered the first light transmissive members 31 from the lateral faces 20c of the light source 20 is less likely to leak to the upper faces 20a of the light sources 20 during lighting inspection. Accordingly, even if a lighting inspection is conducted prior to disposing the light shielding members 42, a light distribution similar to that achieved when the light shielding members 42 are disposed, i.e., a light distribution closer to that of a completed planar light source 301, can be achieved during the lighting inspection. This makes it possible to more accurately adjust chromaticity and more easily determine the amount of a phosphor or light diffusing material in cases of adjusting the chromaticity and the light distribution by adding a phosphor or light diffusing material to the second light transmissive members 32 based on the lighting inspection results as described later.

The first light transmissive members 31 can partially cover the upper faces 20a of the light sources 20 in some or all unit regions 10U as long as a light distribution close to that of a completed planar light source 301 can be achieved during the lighting inspection. Furthermore, if the light transmissive members 31 covering the upper faces 20a of the light sources 20 are sufficiently thin, the first light transmissive members 31 can cover the entire upper faces 20a of the light sources 20 in some or all unit regions 10U.

The upper face 31a of a first light transmissive member 31 preferably has a recessed part 31d recessed towards the second principal face 10b of the light guide plate 10. Accordingly, the curved upper face 31a of the first light transmissive member 31 diffuses the light exiting the light source 20, thereby suppressing the luminance in the vicinity of the light source 20 from becoming too high.

As described above, in at least one of the through hole 11 where the first light transmissive member 31 is disposed, there is a space remaining for disposing at least a second light transmissive member 32. By disposing a second light transmissive member 32 containing a phosphor or light diffusing material based on the lighting inspection results in at least one of the through holes 11 on the upper face 20a of the light source 20 and the upper face 31a of the first light transmissive member 31, the color and the distribution of the light emitted by the light sources 20 can be adjusted per light emitting unit U. As described above, the upper face 31a of a first light transmissive member 31 having a recessed part 31d makes it possible to adjust the position and the amount of a phosphor or light diffusing material to be added to the second light transmissive member 32 in accordance with the position or the size of the recessed part 31d, thereby increasing the adjustment ranges for the color and the distribution of the light emitted by each light source 20. For example, a recessed part 31d in this embodiment is recessed towards the second principal face side of the light guide plate 10 at a position lower than the upper face 20a of the light source 20 so as to arrange the phosphor or the light diffusing material added to the second light transmissive member 32 in the vicinity of the lateral faces 20c of the light source 20. This allows the light emitted from the light source 20 to readily irradiate the phosphor or the light diffusing material in the second light transmissive member 32.

The first light transmissive member 31 preferably covers as much areas of the lateral faces 20c of the light source 20 as possible. Specifically, the first light transmissive member 31 preferably covers at least 60%, more preferably at least 80%, of each lateral face 20c of the light source 20. This can more efficiently allow the light exiting the lateral faces 20c of the light source 20 to enter the light guide plate 10 during a lighting inspection, to thereby allow for a more accurate evaluation of the beam spread of light in the light guide plate 10. In the example shown in FIG. 5B, the first light transmissive member 31 entirely covers the cover member 24 and the light transmissive member 22 exposed as a portion of the lateral faces 20c of the light source 20. The first light transmissive member 31 can further cover the light adjusting member 23.

Figure 5B:
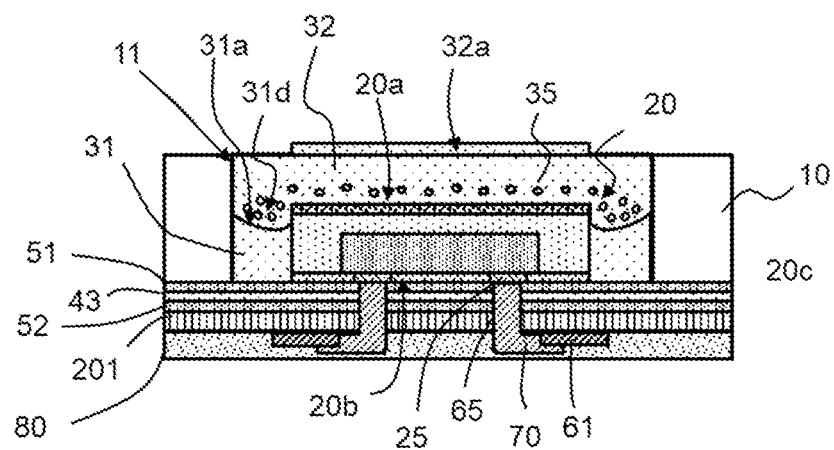
FIG. 5B is a schematic cross-sectional view of the main part of one light emitting unit of another example of the planar light source shown in FIG. 1.

As shown in FIG. 5A and FIG. 5B, the position of the outer edge of the upper face 31a of the first light transmissive member 31 in contact with the light guide plate 10 and the position of the inner edge in contact with the lateral faces 20c of the light source 20 can be appropriately set. Particularly, the outer edge of the upper face 31a of the first light transmissive member 31 is preferably set at a higher position than the inner edge, to thereby readily allow the light from the light source 20 to enter the light guide 10.

The first light transmissive member 31 contains a light transmissive resin, for example, a silicone resin, epoxy resin, or resin mixture of them. The first light transmissive member 31 can further contain a light diffusing material formed of particles of titanium oxide, silica, alumina, zinc oxide, or glass.

Second Light Transmissive Member 32 and Phosphor 35

The second light transmissive member 32 is disposed in the through hole 11 to cover at least the upper face 31a of the first light transmissive member 31 in at least one of the unit regions 10U of the light guide plate 10. In this embodiment, the second light transmissive member 32 is located on the upper face 20a of the light source 20 and the upper face 31a of the first light transmissive member 31 and is in contact with the lateral face 11c that defines the through hole 11. The second light transmissive member 32 does not have to be in contact with the lateral face 11c that defines the through hole. In the case in which the upper face 31a of the first light transmissive member 31 has a recessed part 31d, the lower face 32b of the second light transmissive member 32 has a first protrusion part 32d protruding towards the second principal face 10b of the light guide plate 10 at a position where the protrusion part 23d is in contact with the upper face 31a of the first light transmissive member 31. In the case in which the second light transmissive member 32 contains a light diffusing material, a portion of the light exiting the upper face 20a of the light source 20 can also enter the light guide plate 10.

The position of the upper face 32a of the second light transmissive member 32 can be the same as the position of the first principal face 10a of the light guide plate 10. In the case in which the upper face 32a has a recessed or protrusion part, the bottom of the recessed part of the upper face 32a can be positioned lower than the first principal face 10a of the light guide plate 10, or the protrusion part of the upper face 32a can be positioned higher than the first principal face 10a.

Similar to the first light transmissive member 31, the second light transmissive member 32 contains a light transmissive resin, for example, a silicone resin, epoxy resin, or resin mixture of them.

As shown in FIG. 3A, the planar light source 301 includes a phosphor 35, and the phosphor 35 can be provided in the second light transmissive member 32 in at least one of the unit regions 10U. In this case, in the second light transmissive member 32, the phosphor 35 can be localized towards the lower face 32b. For example, localized here refers to a higher density of the phosphor 35 in the lower portion than the upper portion of the second light transmissive member 32 when divided into two in the height direction.

The phosphor 35 is added based on the results of a lighting inspection. For example, in the case in which a red component is determined to be deficient in the light in a certain unit region as a result of a lighting inspection, a phosphor 35 that emits red light is added. The phosphor 35 to be added to the second light transmissive member 32 can be of one kind, or two or more kinds having different emission colors. The amount of the phosphor 35 added can be adjusted based on the lighting inspection results. If it is found unnecessary to add any phosphor 35 as a result of a lighting inspection, the second light transmissive member 32 does not have to contain any phosphor 35 in any unit region 10U. Furthermore, a light diffusing material can be added based on the results of a lighting inspection. For example, in the case in which the luminance is determined to be low in a certain unit region, the amount of light extracted from the upper face 10a of the light guide plate 10 and the upper face 32a of the second light transmissive member 32 can be increased by adding a light diffusing material, whereby the luminous intensity distribution of the planar light source 301 can be adjusted.

The light transmissive resin contained in the second light transmissive member 32 can be the same as, or different from, the light transmissive resin contained in the first light transmissive member 31. In the case in which the second light transmissive member 32 contains the same light transmissive resin as that in the first light transmissive member 31, the refractive index of the second light transmissive member 32 and the refractive index of the first light transmissive member 31 are substantially the same. Because the refractive index difference at the interface between the upper face 31a of the first light transmissive member 31 and the lower face 32b of the second light transmissive member 32 is small or zero, the reflection at the interface can be reduced, and the light efficiently transmits through the interface between the first light transmissive member 31 and the second light transmissive member 32.

In the case of suppressing the luminance near the light source 20 from becoming too high by reflecting the light propagating in the first light transmissive member 31 on the upper face 31a of the first light transmissive member 31, the refractive index of the second light transmissive member 32 is preferably lower than the refractive index of the first light transmissive member 31.

As described earlier, a phosphor 35 can be added to the second light transmissive member 32 based on the chromaticity or the like of the light emitted by the light source 20 in at least one unit region 10U during manufacturing process. As shown in FIG. 3B, in a unit region 10U that needs no addition of a phosphor 35, the second light transmissive member 32 does not have to contain any phosphor 35.

The second light transmissive member 32 can further contain a light diffusing material formed of particles of titanium oxide, silica, alumina, zinc oxide, or glass.

Light Reflecting Member 41

A light reflecting member 41 is disposed in the sectioning grooves 12 of the light guide plate 10. Accordingly, the light reflecting member 41 is positioned along the perimeter of at least one unit region 10U of the light guide plate 10, and in the top view, at least one unit region 10U is surrounded by the light reflecting member 41. The light reflecting member 41 reflects a portion of or the entire light that exited a light source 20 and entered the light guide plate 10. This suppresses the light that exits the light source 20 from entering adjacent unit regions 10U.

For the light reflecting member 41, for example, a resin containing a light diffusing material or a metal can be used. For the resin used as the light reflecting material, a thermoplastic resin, such as an acrylic resin, polycarbonate resin, cyclic polyolefin resin, polyethylene terephthalate resin, or polyester resin, or a thermosetting resin, such as an epoxy resin or silicone resin can be used. For the light diffusing material, particles of titanium oxide, silica, alumina, zinc oxide, or glass can be used. For the metal used as the light reflecting member, for example, platinum (Pt), silver (Ag), rhodium (Rh), or aluminum (Al) can be used. In FIG. 3A and FIG. 3B, the light reflecting members 41 are disposed in the sectioning grooves 12, but the light reflecting members 41, for example, can be disposed to cover the inner lateral surfaces of the sectioning grooves 12 in the form of a layer, creating a space in the sectioning grooves 12.

The reflectance of the light reflecting member 41 is preferably in a range of 20% to 95%, more preferably in a range of 50% to 90%, relative to the light from a light source 20, which can be appropriately determined in accordance with the required specifications of the planar light source 301. For example, in the case of driving the light emitting units U of a planar light source 301 using local dimming, and high contrast light emission characteristics across the border between a lit light emitting unit U and an unlit light emitting unit U are sought, the light reflecting member 41 preferably has a higher reflectance. On the other hand, the light emission characteristics where the luminance gradually change across the border between a lit light emitting unit U and an unlit light emitting unit U are sought, the light reflecting member 41 preferably has a lower reflectance.

Light Shielding Member 42

A light shielding member 42 is disposed at least on a portion of the upper face 32a of the second light transmissive member 32 in the through hole 11 of at least one of the unit regions 10U. The light shielding member 42 reflects a portion and transmits the other portion of the light that has exited the light source 20 and transmitted through the second light transmissive member 32. The thickness of such a light shielding member 42 is preferably 0.005 mm to 0.2 mm, more preferably 0.01 mm to 0.075 mm. The reflectance of the light shielding member 42 is preferably set lower than the reflectance of the light adjusting member 23 of the light source 20, for example, in a range of 20% to 90%, more preferably in a range of 30% to 85% relative to the light from the light source 20. The light shielding member 42, for example, can be formed with a resin material containing a light diffusing material, or a metal material. For example, a silicone resin, epoxy resin, or a resin mixture of them can be used as the resin material. For the light diffusing material, particles of titanium oxide, silica, alumina, zinc oxide, or glass can be used. The light shielding material 42 can be formed using a dielectric multilayer film. In this embodiment, the light shielding member 42 is formed in the form of a film, but can be disposed in the form of dots.

As shown in FIG. 2, FIG. 3A, and FIG. 3B, in this embodiment, the light shielding member 42 is quadrilateral shaped in the top view. The two sets of sides of the quadrilateral shape are in parallel with those of the light reflecting member 41 located along the perimeter of the light emitting unit U. The light shielding member 42 preferably covers a part of the upper face 32a of the second light transmissive member 32 and positioned above the upper face 20a of the light source 20. In this embodiment, the light shielding member 42 covers the area above the light source 20 and is positioned in the through hole 11 in the top view. At least a portion of the upper face 32a of the second light transmissive member 32 is not covered by the light shielding member 42 and is thus externally exposed. The shape of the light shielding member 42 in the top view can be circular or another shape, and the light shielding member can be larger than the upper face 32a of the second light transmissive member 32, covering the entire upper face 32a while positioning the outer edge in the first principal face 10a of the light guide plate 10.

The light shielding members 42 can be positioned at several locations on the first principal face 10a of the light guide plate 10 in addition to the upper face 32a of the second light transmissive member 32 in order to, for example, reduce luminance nonuniformity.

Light Reflecting Sheet 43

A light reflecting sheet 43 is positioned between the wiring substrate 201 and the light guide plate 10, covering the second principal face 10b of the light guide plate 10. In this embodiment, a light transmissive adhesive sheet 51 is interposed between the light reflecting sheet 43 and the second principal face 10b of the light guide 10 in order to adhere the light reflecting sheet 43 to the second principal face 10b of the light guide plate 10. As shown in FIG. 3A and FIG. 3B, the light reflecting sheet 43 is also located in the through hole 11 of the light guide plate 10, and covers the lower face 20b of the light source 20 and the lower face 31b of the first light transmissive member 31 in the through hole 11. As shown in FIG. 3A and FIG. 3B, the sectioning grooves 12 disposed in the light guide plate 10 can reach the light transmissive adhesive sheet 51 and/or the light reflecting sheet 43.

The light reflecting sheet 43 reflects the portion of the light propagating in the light guide plate 10 that advances outwards from the second principal face 10b towards the first principal face 10a.

For the light reflecting sheet 43, a resin sheet containing a large number of air bubbles (e.g., a foamed resin sheet), a resin sheet containing a light diffusing material, or the like can be used. For the resin used in such a light reflecting sheet 43, for example, a thermoplastic resin, such as an acrylic resin, polycarbonate resin, cyclic polyolefin resin, polyethylene terephthalate resin, or polyester resin, or a thermosetting resin, such as an epoxy resin or silicone resin can be used. For the light diffusing material, particles of titanium oxide, silica, alumina, zinc oxide, or glass can be used.

Wiring Substrate 201

A wiring substrate 201 has a first principal face 201a and a second principal face 201b located opposite the first principal face 201a, where the first principal face 201a is bonded to the light reflecting sheet 43 using an adhesive sheet 52. The wiring substrate 201 internally has a wiring pattern for electrically connecting the light sources 20, and in the area corresponding to the through hole 11 in the unit region 10U of the light guide plate 10, the wiring pattern is electrically connected to the terminals 61 located on the second principal face 201b. The wiring pattern can be positioned on the first principal face 201a or the second principal face 201b of the wiring substrate 201.

The wiring substrate 201, the adhesive sheet 52, the light reflecting sheet 43, and the light transmissive adhesive sheet 51 have holes 65 that partially expose the electrodes 25, and the wiring portions 70 are disposed in the holes 65. The wiring portions 70 are in contact with the electrodes 25 at one end, and connected to the terminals on the second principal face 201b of the wiring substrate 201 at the other end. The wiring substrate 201 is electrically connected to the light sources 20.

Insulation Layer 80

An insulation layer 80 is disposed on the second principal face 201b of the wiring substrate 201 while covering the terminals 61 and the wiring portions 70 located on the second principal face 201b. By covering the second principal face 201b of the wiring substrate 201, the insulation layer 80 can reduce electrical short circuits of the terminals on the second principal face 201b and protect the second principal face 201b from the external environment.

Method of Manufacturing Planar Light Source 301

Figure 6:
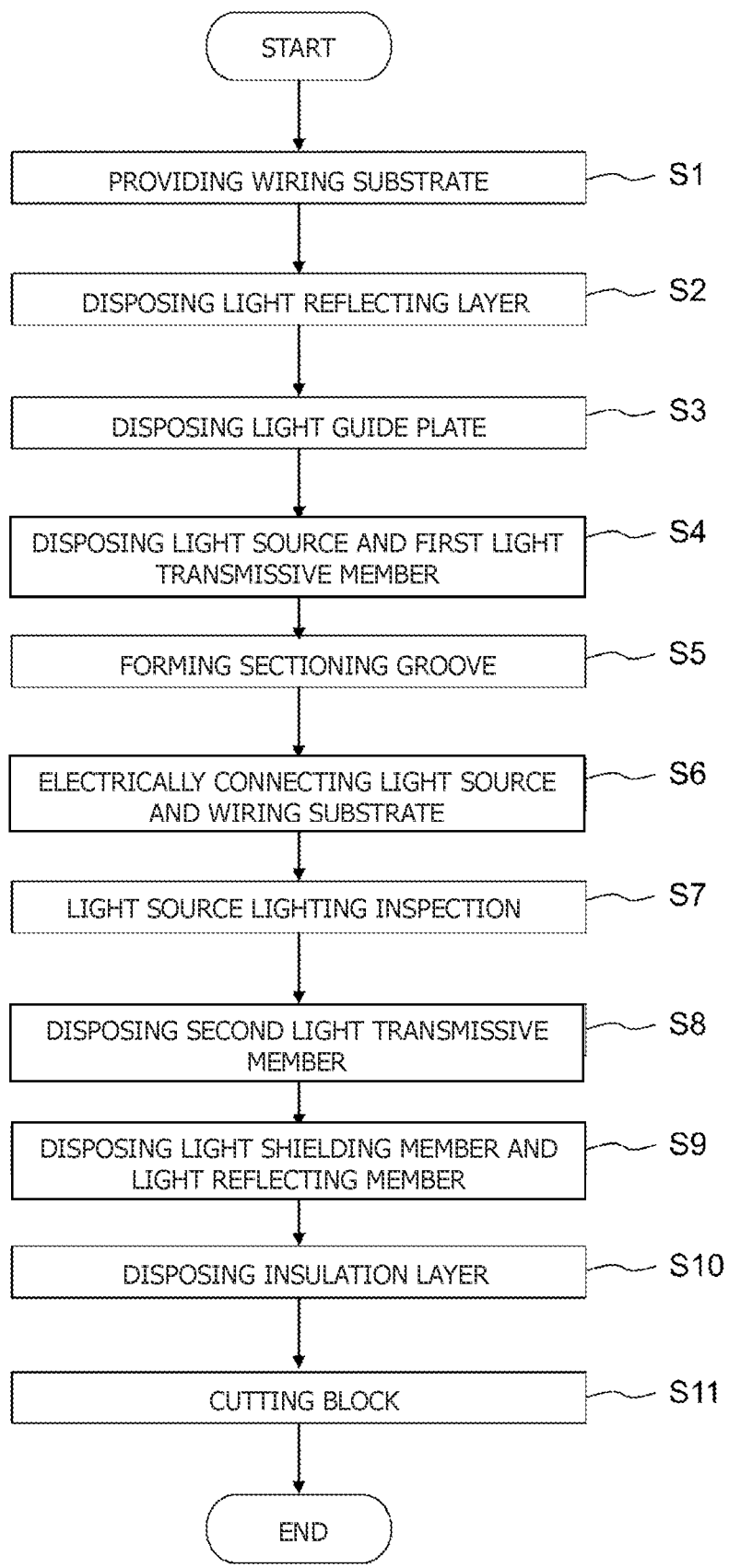
FIG. 6 is a flowchart of a method of manufacturing a planar light source according to one embodiment.

One embodiment of a method of manufacturing a planar light source 301 will be explained. FIG. 6 is a flowchart of one example of the method of manufacturing a planar light source 301. FIG. 7A to FIG. 7K are cross-sectional views showing the processes in the method of manufacturing a planar light source 301 shown in FIG. 6. FIG. 7A to FIG. 7K each show a cross section of a light emitting unit U for which the reference numeral is omitted. The method of manufacturing a planar light source 301 according to this embodiment includes at least a process of providing a wiring substrate (S1), a process of disposing a light guide plate (S3), a process of disposing light sources and at least one first light transmissive member (S4), and a process of disposing at least one second light transmissive member (S8). The method of manufacturing a planar light source 301 can further include a process of disposing a light reflecting sheet (S2), a process of forming sectioning grooves (S5), a process of electrically connecting the light sources and the wiring substrate (S6), a process of performing a lighting inspection on the light sources (S7), a process of disposing light shielding members and light reflecting members (S9), a process of disposing an insulation layer (S10), and a process of cutting a block (S11).

Process of Providing Wiring Substrate (S1)

Figure 7A:
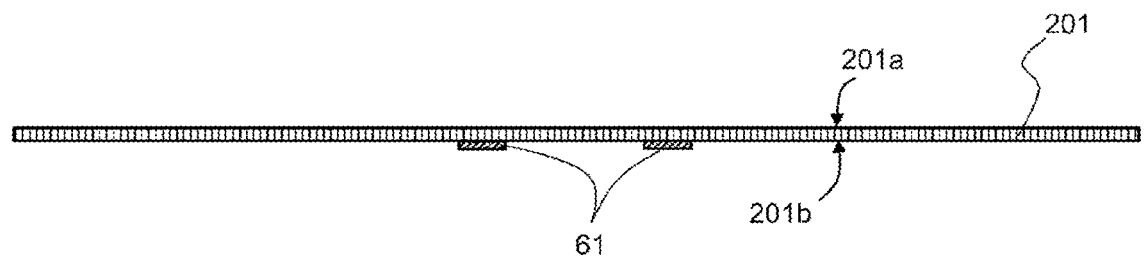
FIG. 7A is a schematic cross-sectional view showing the method of manufacturing a planar light source 301 shown in FIG. 6.
Figure 7B:
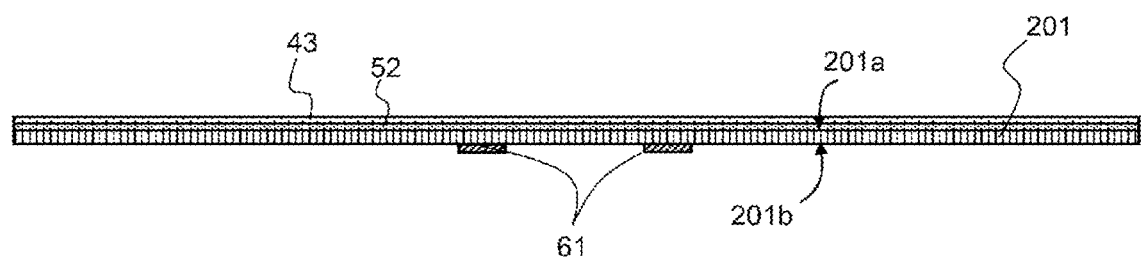
FIG. 7B is a schematic cross-sectional view showing the method of manufacturing a planar light source 301 shown in FIG. 6.

As shown in FIG. 7A, a wiring substrate 201 having a first principal face 201a and a second principal face 201b positioned opposite the first principal face 201a is provided. Terminals 61 are disposed on the second principal face 201b, and a wiring pattern is formed inside the wiring substrate 201. The wiring pattern can be formed on the first principal face 201a and the second principal face 201b.

Process of Disposing Light Reflecting Sheet (S2)

A light reflecting sheet 43 is disposed on the first principal face 201a of the wiring substrate 201. A light reflecting sheet 43 is adhered to the wiring substrate 201 by disposing an adhesive sheet 52 on the first principal face 201a of the wiring substrate 201 and disposing the light reflecting sheet 43 on the adhesive sheet 52. Alternatively, a wiring substrate that already includes a light reflecting sheet 43 bonded to the first principal face 201a can be provided, or a wiring substrate in which the first principal face 201a has light reflecting properties can be provided. In such a case, this process can be omitted.

Process of Disposing Light Guide Plate (S3)

Figure 8:
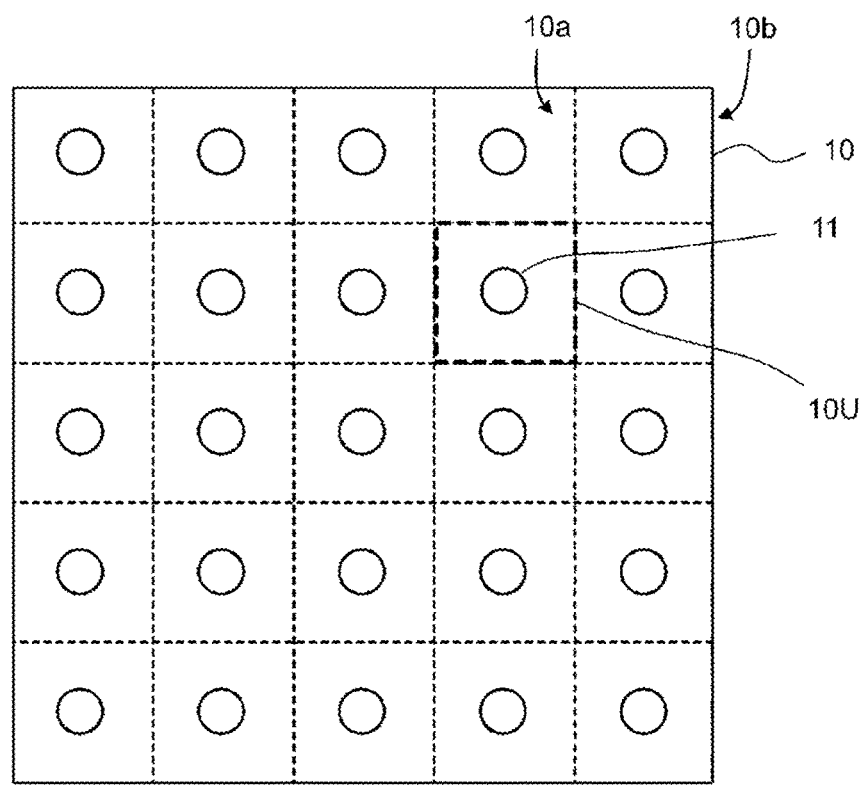
FIG. 8 is a schematic top view of a light guide plate used in the method of manufacturing a planar light source 301 shown in FIG. 6.

A light guide plate 10 is provided. FIG. 8 is a top view of the light guide plate 10. The light guide plate 10 has a first principal face 10a, a second principal face 10b positioned opposite the first principal face 10a, and a plurality of one-dimensionally or two-dimensionally arranged unit regions 10U. The light guide plate 10 has a plurality of through holes 11 arranged in the unit regions 10U and being open in the first principal face 10a and the second principal face 10b of the light guide plate 10. The unit regions 10U are arranged, for example, across five rows and five columns in the x and y directions. In FIG. 8, the broken lines indicate the boundaries of the unit regions 10U, but no grooves need to be disposed at the positions indicated by the broken lines in the light guide plate 10.

In FIG. 8, the light guide plate 10 has the size to accommodate the number of light emitting units U configuring a planar light source 301 ultimately manufactured, but a light guide plate block having more unit regions 10U than the number of the light emitting units U of a planar light source 301 can be provided. For example, a light guide plate block integrating four light guide plates 10 can be used. In this case, the light guide plate block includes, for example, unit regions 10U arranged in 10 rows and 10 columns.

Figure 7C:
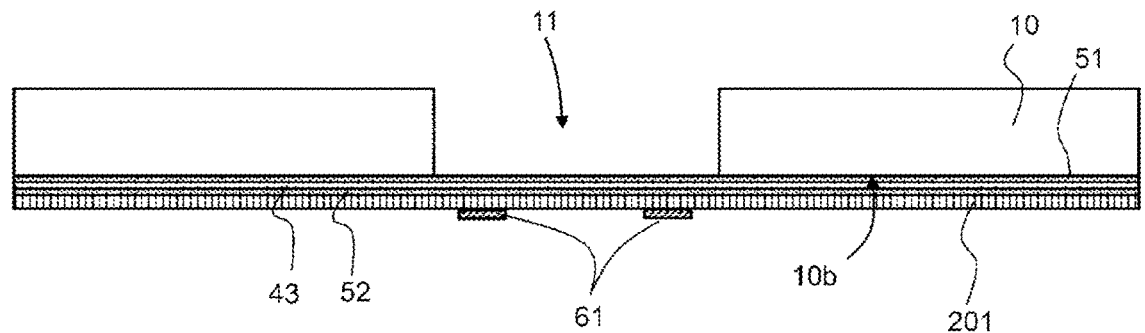
FIG. 7C is a schematic cross-sectional view showing the method of manufacturing a planar light source 301 shown in FIG. 6.

As shown in FIG. 7C, by placing the light guide plate 10 on the first principal face 201a of the wiring substrate 201 while interposing a light transmissive adhesive sheet 51, the light guide plate 10 is fixed to the wiring substrate 201. In this embodiment, because the light reflecting sheet 43 is disposed on the first principal face 201a of the wiring substrate 201, the light reflecting sheet 43 is bonded to the second principal face 10b of the light guide plate 10 via the light transmissive adhesive sheet 51.

Figure 7D:
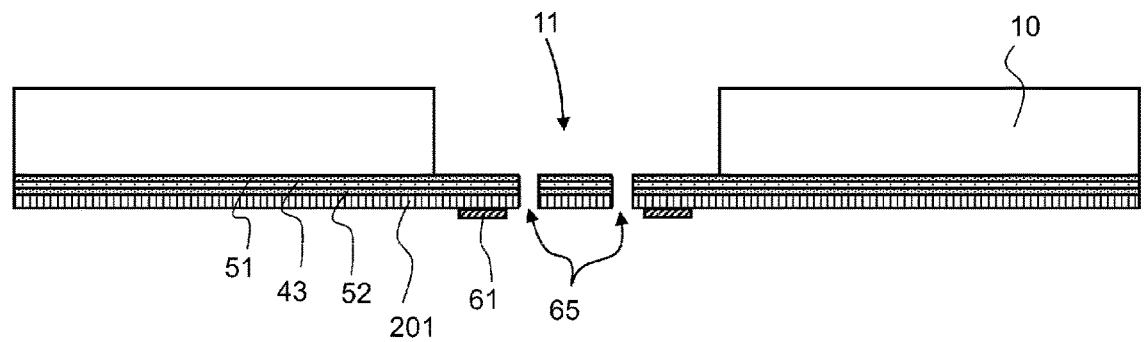
FIG. 7D is a schematic cross-sectional view showing the method of manufacturing a planar light source 301 shown in FIG. 6.

As shown in FIG. 7D, holes 65 are created for forming wiring portions 70 that connect the light sources 20 and the terminals 61 of the wiring substrate 201. Specifically, holes 65 are created continuously through the light transmissive adhesive sheet 51, the light reflecting sheet 43, the adhesive sheet 52, and the wiring substrate 201 by punching, drilling, or laser processing. Alternatively, the holes 65 continuously going through these sheets can be achieved by stacking the sheets each provided with the holes 65.

Process of Disposing Light Sources and First Light Transmissive Members (S4)

Figure 7E:
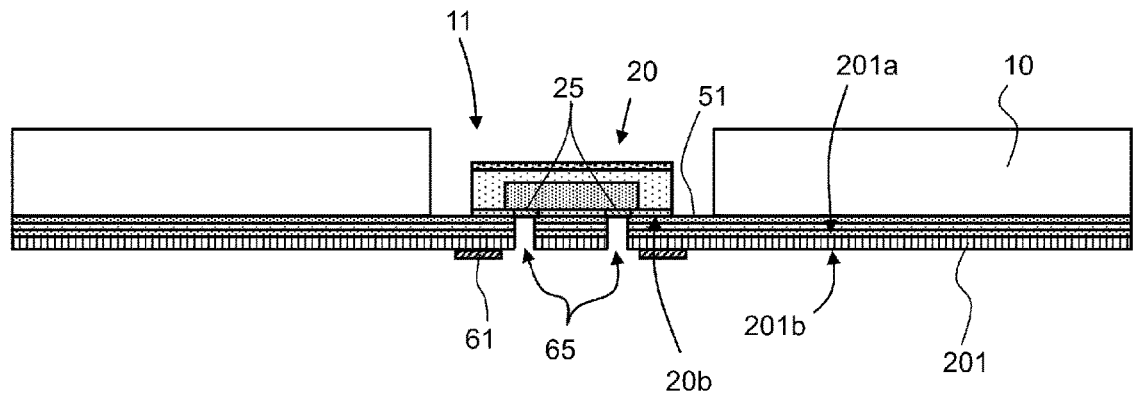
FIG. 7E is a schematic cross-sectional view showing the method of manufacturing a planar light source 301 shown in FIG. 6.
Figure 7F:
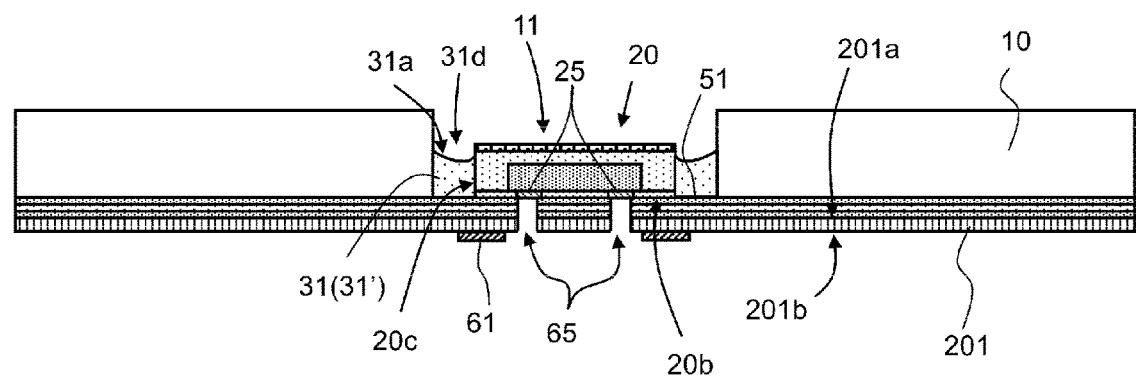
FIG. 7F is a schematic cross-sectional view showing the method of manufacturing a planar light source 301 shown in FIG. 6.

As shown in FIG. 7E and FIG. 7F, in the through hole 11 in the unit regions 10U of the light guide plate, a light source 20 and a first light transmissive member 31 are disposed. Specifically, as shown in FIG. 7E, in the through hole 11 of the light guide plate 10, one light source 20 is disposed on the first principal face 201a of the wiring substrate 201. Because a portion of the light transmissive adhesive sheet 51 is exposed in the through hole 11, the light source 20 is temporarily secured to the wiring substrate 201, by the lower face 20b of the light source 20 contacting the light transmissive adhesive sheet 51. The position of the light source 20 in the through hole 11 is determined such that the electrodes 25 of the light source 20 overlap with the holes 65 in the light transmissive adhesive sheet 51.

As shown in FIG. 7F, an uncured first light transmissive member 31' is disposed in the through hole 11 so as to cover the lateral faces 20c of the light source 20, the lateral face defining the through hole 11, and the upper face of the light transmissive adhesive sheet 51 exposed in the through hole 11. Subsequently, the uncured first light transmissive member 31' is hardened. This causes the uncured first light transmissive member 31' to contract, resulting in a hardened first light transmissive member 31 having a recessed part 31d in the upper face 31a. The position of the upper face 31a and the depth of the recessed part 31d can be adjusted by the supplying quantity of the uncured first light transmissive member 31'. The heating temperature applied when hardening the uncured first light transmissive member 31' is preferably 30° C. to 150° C., more preferably 40° C. to 130° C.

Process of Forming Sectioning Grooves (S5)

Figure 7G:
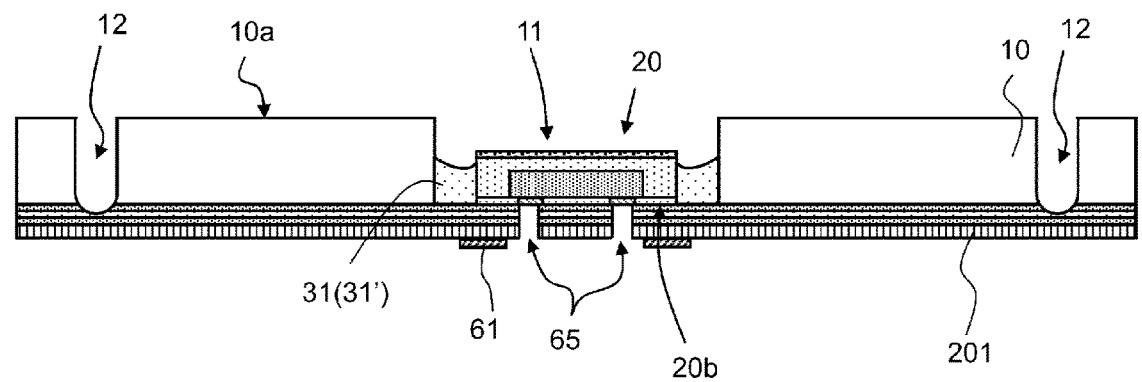
FIG. 7G is a schematic cross-sectional view showing the method of manufacturing a planar light source 301 shown in FIG. 6.

As shown in FIG. 7G, in the case of disposing a light reflecting member 41 to section the unit regions 10U, sectioning grooves 12 are formed in the light guide plate 10. In the first principal face 10a of the light guide plate 10, sectioning grooves 12 are formed along the borders of the unit regions 10U by using, for example, a dicing saw equipped with a rotary blade, laser machining apparatus, or the like.

Process of Electrically Connecting Light Sources and Wiring Substrate (S6)

Figure 7H:
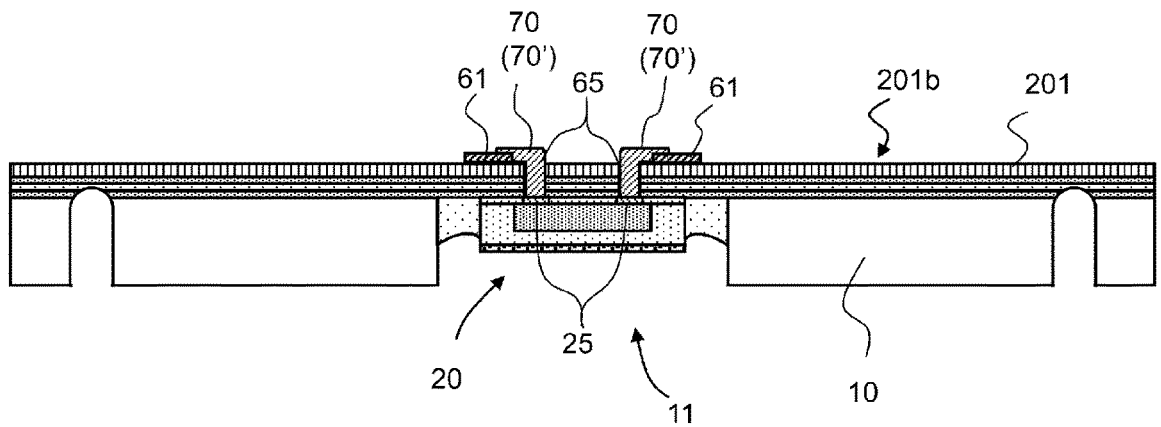
FIG. 7H is a schematic cross-sectional view showing the method of manufacturing a planar light source 301 shown in FIG. 6.

As shown in FIG. 7H, the light sources 20 and the wiring substrate 201 are electrically connected. Specifically, for example, while holding the wiring substrate 201 to which a light guide plate 10 is bonded so as to face the second principal face 201b up, a conductive paste 70' is disposed in the holes 65 and on the second principal face 201b to thereby form a wiring pattern for connecting the electrodes 25 of the light sources 20 and the terminals 61 on the second principal face 201b. Subsequently, wiring portions 70 are formed by removing the solvent from the conductive paste 70' and hardening the material.

The positions of the light sources 20 are fixed by the hardened first light transmissive members 31. This may reduce misalignments between the electrodes 25 of the light sources 20 and the holes 65 or the leakage of the conductive paste 70' from the areas between the holes 65 and the electrodes 25 when the conductive paste 70' is supplied. This may also reduce the disconnecting of the formed wiring portions 70 attributable to the movements of the light sources 20.

Process of Performing Lighting Inspection on Light Sources (S7)

The light sources 20 are lit to inspect the emitted light. While holding the wiring substrate 201 so as to face the light guide plate 10 up, power is supplied to the wiring substrate 201 to light the light sources 20 to inspect the emitted light. For example, the chromaticity distribution can be inspected by simultaneously lighting all light sources 20, capturing the image of the light guide plate 10 from above, and analyzing the captured image.

At this time, the first light transmissive members 31 disposed in the through holes 11 are in contact with the light sources 20 and the light guide plate 10. This can allow the light emitted from the light sources 20 to enter the light guide plate 10 via the first light transmissive members 31, thereby making it possible to inspect the light distribution in a similar state to that of a completed planar light source 301. The light sources 20 can be lit in the absence of the first light transmissive members 31, but this would allow the light emitted from the light sources 20 to be reflected or refracted off the lateral faces 20c of the light sources 20 and the lateral faces defining the through holes 11 of the light guide plate 10 because of the air filling the space in the through holes 11. In such a case, the light distribution obtained during the lighting inspection may considerably differ from the light distribution of the completed planar light source 301.

Process of Disposing Second Light Transmissive Member (S8)

Figure 7I:
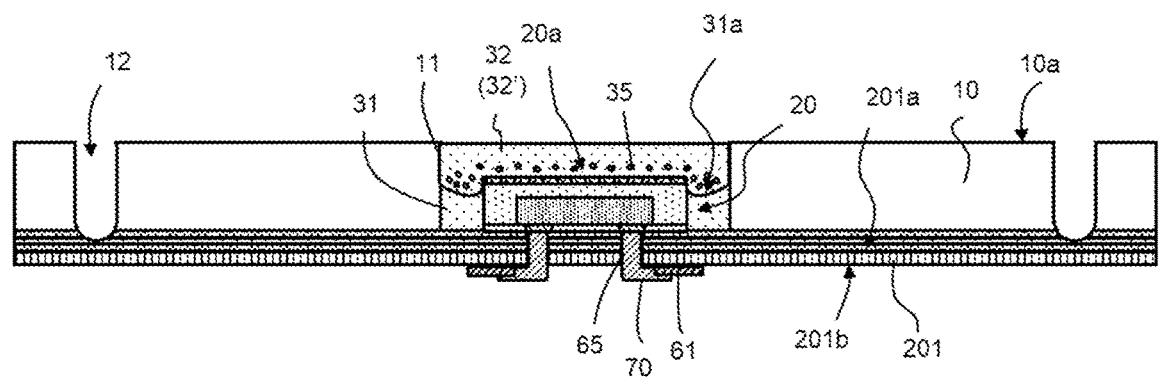
FIG. 7I is a schematic cross-sectional view showing the method of manufacturing a planar light source 301 shown in FIG. 6.
Figure 9:
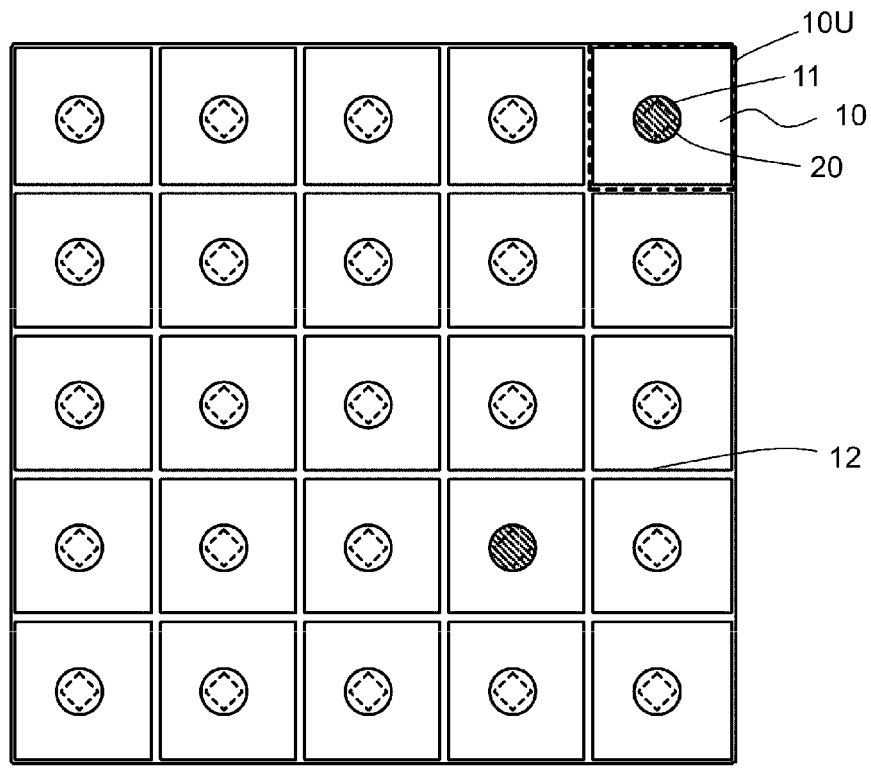
FIG. 9 is a schematic top view showing the positions of the light emitting units in which a phosphor is added to the second light transmissive member in the method of manufacturing a planar light source 301 shown in FIG. 6.

A second light transmissive member 32 is disposed in at least one of the through holes 11. As shown in FIG. 7I, an uncured second light transmissive member 32' is disposed in the through holes 11 in the unit regions U so as to cover at least the upper face 31a of the first light transmissive member 31. At this time, based on the results of the lighting inspection described above, at least either a phosphor 35 or a light diffusing material can be added to the uncured second light transmissive member 32' in at least one of the unit regions. For example, as shown in FIG. 9, a phosphor 35 is added to the uncured second light transmissive members 32' in the through holes 11 indicated with hatching lines among the unit regions U arranged across five rows and five columns. The kind and the amount of the phosphor 35 can be determined based on the lighting inspection results.

By subsequently hardening the uncured second light transmissive member 32', the second light transmissive member 32 is provided in at least one of the through holes 11. The heating temperature applied when hardening the uncured second light transmissive member 32' is preferably 30° C. to 150° C., more preferably 40° C. to 130° C.

Process of Disposing Light Shielding Member and Light Reflecting Member (S9)

Figure 7J:
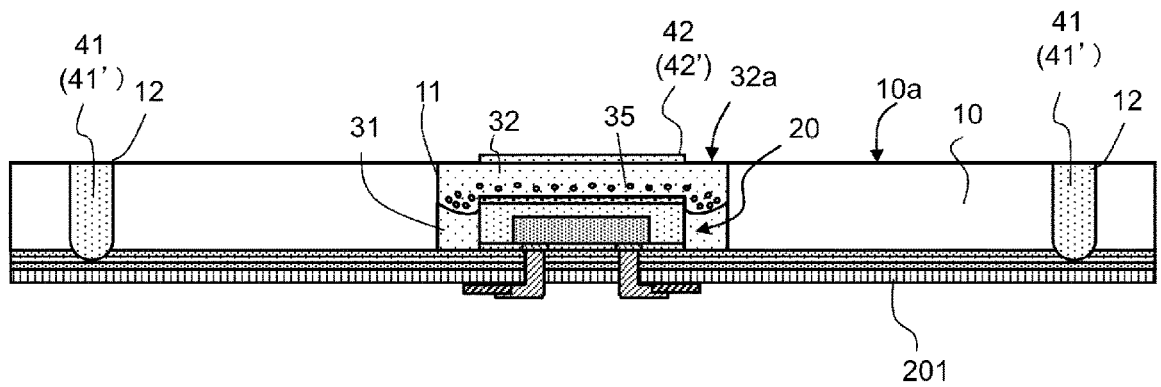
FIG. 7J is a schematic cross-sectional view showing the method of manufacturing a planar light source 301 shown in FIG. 6.

As shown in FIG. 7J, a light reflecting member 41 is disposed on the light guide plate 10, and a light shielding member 42 is disposed on the second light transmissive member 32. An uncured light reflecting member 41' is disposed in the sectioning grooves 12 in the light guide plate 10. Similarly, an uncured light shielding member 42' is disposed so as to cover the upper face 32a of the second light transmissive member 32. By subsequently hardening the uncured light reflecting member 41' and the uncured light shielding member 42', the light reflecting members 41 are formed in the sectioning grooves 12 of the light guide plate 10 and the light shielding members 42 are formed on the upper faces 32a of second light transmissive members 32.

Process of Disposing Insulation Layer (S10)

Figure 7K:
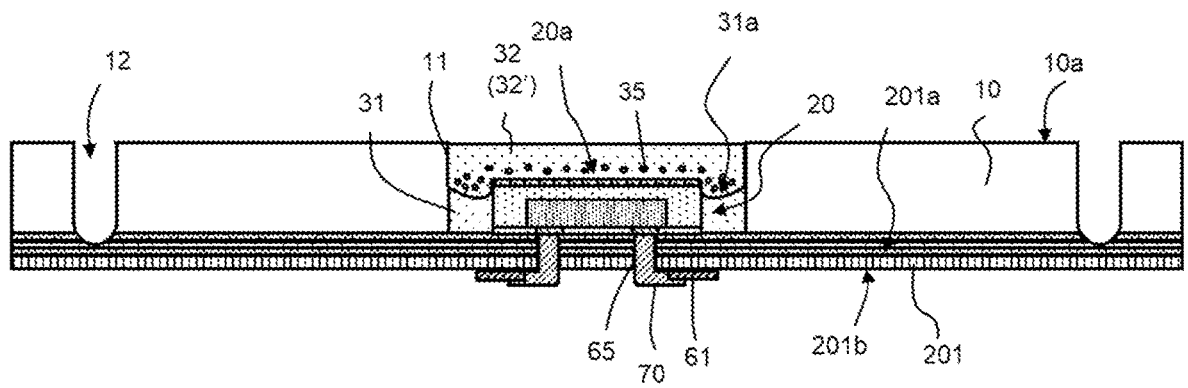
FIG. 7K is a schematic cross-sectional view showing the method of manufacturing a planar light source 301 shown in FIG. 6.

As shown in FIG. 7K, an insulation layer 80 is formed on the second principal face 201b of the wiring substrate 201 so as to cover the terminals 61 and the wiring portions 70. This completes a planar light source 301.

Process of Cutting Block (S11)

In the case in which a block of light guide plates 10 is formed, a structure body in which a plurality of planar light sources 301 are connected is produced by the processes described above. Individual planar light sources 301 are obtained by cutting the structure body. Accordingly, multiple planar light sources 301 separated from one another are completed.

Characteristics of Planar Light Source and Method of Manufacturing Planar Light Source According to a planar light source and a method of manufacturing a planar light source according to this embodiment, at least one first light transmissive member 31 and at least one second light transmissive member 32 is disposed in through holes 11 of the light guide plate 10 where light source 20 are respectively positioned. After disposing the first light transmissive members 31 and electrically connecting the light sources 20 to the wiring substrate 201, the light sources 20 can be lit for testing, and the second light transmissive members 32 can be disposed after adding at least either a phosphor 35 or light diffusing material, to only those in the through holes 11 of the unit regions that require adjustments based on the test results. This can provide a planar light source structured to allow at least either the chromaticity distribution or the luminance distribution to be adjusted during manufacturing process.

Even if the chromaticity of individual light sources are controlled within the predetermined standards, when a plurality of light sources are arranged on a wiring substrate, for example, two light sources in which the chromaticities are biased within the standards might be adjacently arranged. If that were to occur, when all light sources are lit, the two chromatically biased light sources would likely create a large region having heavily biased chromaticity. Even in such a case, the biased chromaticity can be reduced in a planar light source according to this embodiment by applying a phosphor to the second light transmissive member(s) of one or both of the chromatically biased light sources.

Furthermore, during a lighting test, the light from the light sources 20 is allowed to enter the light guide 10 through the first light transmissive member 31. Accordingly, the emitted light during testing can be evaluated in the state that is more similar to the light emission of a completed planar light source 302.

OTHER EMBODIMENTS

Figure 10:
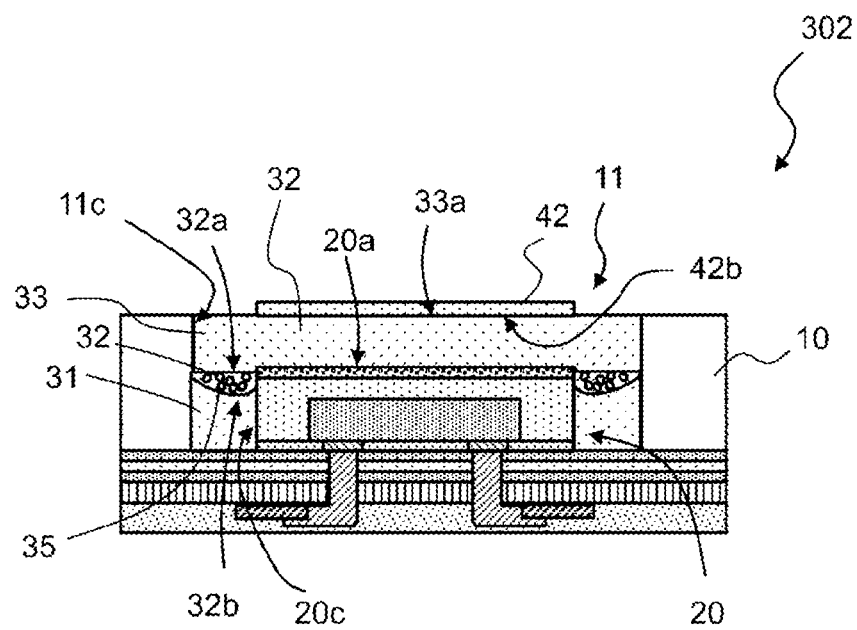
FIG. 10 is a schematic cross-sectional view of the main part of a planar light source according to another embodiment.

Various modifications can be made to any of the planar light sources according to the present disclosure. For example, a planar light source can further include a third light transmissive member 33. FIG. 10 is a cross-sectional view of a planar light source 302 taken along the position corresponding to FIG. 3A. The planar light source 302 includes a first light transmissive member 31, a second light transmissive member 32, and a third light transmissive member 33 disposed in the through hole 11 in at least one of the unit regions 10U. Similar to the planar light source 301, the first light transmissive member 31 positioned in a through hole 11 on the second principal face 10b side is in contact with the light transmissive adhesive sheet 51 as well as the lateral face 11c that defines the through hole 11 and the lateral faces 20c of the light source 20.

The second light transmissive member 32 is disposed in the through hole 11 so as to cover the upper face 31a of the first light transmissive member 31. In the form shown in FIG. 10, the second light transmissive member 32 is not positioned on the upper face 20a of the light source 20, and the upper face 32a of the second light transmissive member 32 is substantially flat. A phosphor 35 is included in the second light transmissive member 32. The second light transmissive member 32 can be in contact with the lateral face 11c that defines the through hole 11, but does not have to be in contact with the lateral face 11c that defines the through hole 11.

The third light transmissive member 33 positioned in the through hole 11 covers the upper face 32a of the second light transmissive member 32 and the upper face 20a of the light source 20. The third light transmissive member 33 is in contact with the lateral face 11c that defines the through hole 11. The lower face 33b of the third light transmissive member 33 is in contact with the upper face 32a of the second light transmissive member 32 and the upper face 20a of the light source 20.

The upper face 33a of the third light transmissive member 33 can be flush with the first principal face 10a of the light guide plate 10. In the case in which the upper face 33a has a recessed part and/or protrusion part, the bottom of the recessed part of the upper face 33a can be positioned lower than the first principal face 10a of the light guide plate 10, or the protrusion part of the upper face 33a can be positioned higher than the first principal face 10a.

A light shielding member 42 is positioned on at least one portion of the upper face 33a of the third light transmissive member 33.

The planar light source 302 can be manufactured in the same or similar manner to the method for the planar light source 301. For example, similar to the planar light source 301, in the process of disposing a second light transmissive member (S8), an uncured second light transmissive member 32' is disposed so as to cover at least the upper face 31a of at least one of the first light transmissive members 31. At this time, based on the lighting inspection results, a phosphor 35 can be added to the uncured second light transmissive member 32 in at least one of the unit regions 10U. Subsequently, the uncured second light transmissive member 32 is hardened to obtain the second light transmissive member 32 that contains a phosphor 35.

Subsequently, an uncured third light transmissive member 33 is disposed in at least one of the through holes 11 so as to cover the upper face 32a of the second light transmissive member 32 and the upper face 20a of the light source 20. Subsequently, the uncured third light transmissive member 33 is hardened. The heating temperature applied when hardening the uncured third light transmissive member 33 is preferably 30° C. to 150° C., more preferably 40° C. to 130° C. The other processes can be performed in the same or similar manner to in the planar light source 301.

According to the planar light source 302, a first light transmissive member 31, a second light transmissive member 32, and a third light transmissive member 33 are disposed in at least one of the through holes 11 of the light guide plate 10. This can reduce the height of the third light transmissive member 33 in the through hole 11. When manufacturing a planar light source 302, because the first light transmissive member 31 and the second light transmissive member 32 are hardened before an uncured third light transmissive member 33 is disposed in the through hole 11. Accordingly, the position of the lower face 33b of the third light transmissive member 33 is less likely to be lowered when the uncured third light transmissive member 33 is hardened. Accordingly, the lowering amount of the upper face of the uncured third light transmissive member 33 disposed in the through hole 11 can be reduced, and the upper face of the uncured third light transmissive member can be made uniform. In other words, this can provide a third light transmissive member 33 having a substantially flat upper face 33a in the through hole 11. This, as a result, can make the lower face 42b of the light shielding member 42 flat, thereby making the light reflected by the lower face 42b of the light shielding member 42 uniform. This can make the light distribution in each light emitting unit U more uniform.

The planar light source according to any of the embodiments in the present disclosure is useful in various planar light source applications, or the like. Particularly, the planar light sources can be advantageously applied to backlight units intended for liquid crystal display devices, and can be suitably employed in, for example, backlights for the display devices of mobile devices that must meet strict thickness reduction requirements, planar light source devices capable of local dimming control, and the like.

What is claimed is:

1. A method of manufacturing a planar light source, the method comprising:
    providing a wiring substrate comprising:
        a first principal face, and
        a second principal face located opposite the first principal face;
    locating a light guide plate on the first principal face of the wiring substrate, wherein the light guide plate comprises:
        a first principal face,
        a second principal face located opposite the first principal face,
        a plurality of unit regions arranged in one dimension or two dimensions, and
        a plurality of through holes that are open at the first principal face and the second principal face, wherein at least one of the through holes is located in the unit regions;
    locating light sources in the through holes in the unit regions on the first principal face of the wiring substrate;
    locating a first light transmissive member in a first of the through holes so as to cover at least a portion of a lateral face of at least one light source located in the first through hole;
    after the step of locating the first light transmissive member:
        electrically connecting the light sources and the wiring substrate, and
        inspecting light emitted from the light sources by lighting the light sources; and
    after the steps of electrically connecting the light sources and the wiring substrate and inspecting the light emitted from the light sources, locating a second light transmissive member in the first through hole so as to cover at least an upper face of the first light transmissive member; wherein:
    in the step of locating the second light transmissive member, a phosphor is added to the second light transmissive member based on a result of the step of inspecting the light emitted from the light sources.

2. The method of manufacturing a planar light source according to claim 1, further comprising:
    forming a plurality of sectioning grooves that are open at the first principal face of the light guide plate and that, in a top view, surround the unit regions along perimeters of the unit regions, and
    locating a plurality of light reflecting members in the sectioning grooves.

3. The method of manufacturing a planar light source according to claim 1, further comprising:
    subsequent to the step of locating the second light transmissive member, locating at least one light shielding member on an upper face of the second light transmissive member.

4. The method of manufacturing a planar light source according to claim 1, wherein:
    the upper face of the first light transmissive member comprises a recessed part recessed towards the second principal face of the light guide plate, and
    a lower face of the second light transmissive member comprises a first protrusion part that is in contact with the upper face of the first light transmissive member and protrudes towards the second principal face side of the light guide plate.

5. The method of manufacturing a planar light source according to claim 1, wherein:
   the first light transmissive member entirely covers lateral faces of the at least one light source located in the first through hole.

6. The method of manufacturing a planar light source according to claim 1, wherein:
   the phosphor is localized on a lower face side of the second light transmissive member.

7. The method of manufacturing a planar light source according to claim 1, wherein:
   the second light transmissive member further covers an upper face of the at least one light source located in the first through hole.

\* \* \* \* \*